United States Patent [19]

Bestenreiner et al.

[11] 4,265,528
[45] May 5, 1981

[54] PHOTOGRAPHIC CAMERA WITH AUTOMATIC FOCUSSING SYSTEM

[75] Inventors: Friedrich Bestenreiner, Gründwald; Klaus Birgmeir, Munich, both of Fed. Rep. of Germany

[73] Assignee: AGFA-Gevaert AG, Leverkusen, Fed. Rep. of Germany

[21] Appl. No.: 20,240

[22] Filed: Mar. 13, 1979

[30] Foreign Application Priority Data

Mar. 15, 1978 [DE] Fed. Rep. of Germany ....... 2811279

[51] Int. Cl.$^3$ ........................... G03B 3/00; G03B 7/08
[52] U.S. Cl. .................................... 354/195; 352/140; 354/25
[58] Field of Search .......................... 354/25, 195–200; 250/201, 204; 352/140

[56] References Cited

U.S. PATENT DOCUMENTS 3,886,567  5/1975  Matsumoto et al. .................... 354/25

*Primary Examiner*—L. T. Hix
*Assistant Examiner*—Thomas H. Tarcza
*Attorney, Agent, or Firm*—Michael J. Striker

[57] ABSTRACT

Upon termination of shooting, the exposure objective of a still or motion-picture camera is automatically returned to a predetermined starting position, such as at the middle of the available range of distance-settings. If the camera's focussing system is fully automatic, this is preferably achieved by overriding normal operation of the focussing system by a command signal indicating that the objective is to be brought to starting position and substituted for the normal-operation command signal generated in dependence upon physically measured camera-to-subject distance. If the normal-operation command signal of the system is manually selected, as in the case of a closed-loop positioning system wherein the command transducer is manually adjusted, or as in the case of an open-loop positioning system in which the actuating signal of the system is manually established, the signal commanding or actuating a return to starting setting is likewise substituted for the normal-operation command or actuating signal.

16 Claims, 3 Drawing Figures

PHOTOGRAPHIC CAMERA WITH AUTOMATIC FOCUSSING SYSTEM

BACKGROUND OF THE INVENTION

The present invention concerns photographic cameras, most especially but not exclusively motion-picture cameras, of the type provided with an automatic focussing system which adjusts the distance-setting of the camera's exposure objective in accordance with one or another of the various techniques which have now become conventional in the art. Most typically, such systems employ one or another form of adjusting motor coupled to the exposure objective and operative when actuated for changing the distance-setting of the objective. In a simple, fully automatic focussing system, the actuating signal applied to the adjusting motor is furnished from the output of a servo comparator, one input of which receives an actual-setting signal per se indicative of the present distance-setting of the exposure objective, with the other input of the servo comparator receiving a required-setting signal supplied to it by a distance-measuring system of one or another conventional type, e.g., operating on the basis of the travel-time measurement of waves transmitted to the subject and reflected back to the camera, operating on the basis of optical triangulation methods, or whatever. With such simple, fully automatic focussing systems, whenever the system is operative the exposure objective is adjusted from whatever its present distance-setting is to a new distance-setting in response to changes in the automatically measured subject-distance. Sometimes, such systems are of only a semiautomatic character. For example, a simple, fully automatic focussing system may have a manual override feature permitting the user to manually control the exposure-objective distance-setting, e.g., with visual reference on the user's part to an automatically operating range finder or by means of subjective skill and choice alone, in which case the adjusting motor of the system receives an actuating which is per se manually varied by the user somewhat in the sense of an ordinary focus-adjuster ring, but with the actual physical change of exposure-objective distance-setting then being implemented by the adjusting motor of the manually overriden fully automatic focussing system. In addition to such simple, fully automatic focussing systems and such manually controlled but motor-adjusted focussing systems, there are also various hybrids of fully automatic and manual control. For example, in some systems, coarse or approximate focussing is performed under manual control, e.g., through the intermediary of the adjusting motor, and fine-adjustment focussing then follows in a fully automatic manner.

No matter how the actuating signal for the adjusting motor is developed, i.e., fully automatically, by means of manual selection alone, or by a hybrid of the two, the time required for the adjusting motor to bring the exposure objective to the distance-setting commanded necessarily depends upon the amount of the difference between the objective's present distance-setting and the distance-setting into which it is to be brought. If, when the user is ready to initiate a still exposure or a motion-picture exposure sequence, the present distance-setting of the exposure objective is far removed from the distance-setting into which the objective must be brought, considerable time may be required for the objective to be actually brought into the proper setting, e.g., even as long as several seconds, resulting in often important delays in the possibility of initiating well-focussed exposures and/or resulting, in motion-picture contexts, in the production of a series of quite poorly focussed exposures at the start of a motion-picture scene.

Especially when such systems are employed in motion-picture cameras, it is known to terminate operation of the adjusting motor at the termination of the exposure sequence, with the result that when the next exposure sequence is to be initiated the exposure objectivve will be at the distance-setting last used or reached at the conclusion of the previously filmed scene. This can be extremely undesirable for several reasons. Firstly, in worst-case situations, the previous distance-setting of the objective may be very far or maximally removed from the distance-setting next needed, so that the duration of the time interval required to bring the objective into the distance-setting next needed may be really very considerable. In addition to such time interval being sometimes rather lengthy, it is furthermore variable and indefinite. As a result, to the extent that the user consciously or unconsciously accustoms himself to the fact of such a time delay, he will not in general be in a position to know what the true length of the delay will be in any given situation, e.g., because despite his approximate awareness of the subject-distance presently involved he will find it impractical to attempt to remember what the previous subject-distance was. In this way, from habit or conservativeness, the user tends to accustom himself to the longest value of the time delay, because despite his awareness of the present subject-distance he has from that no real advance idea of what the amount of the time delay will be.

SUMMARY OF THE INVENTION

It is a general object of the invention to provide a focussing system of for example any of the types referred to above in which the problems associated with the time delay in question are inherently reduced.

It is a more specific object of the invention to provide a focussing system in which the above discussed indefiniteness of the variable amount of the time delay is inherently reduced.

It is another object to provide a focussing system whose mode of operation inherently tends to reduce the probability of excessively long values of the time delay in question.

It is a further object to provide a focussing system which additionally tends inherently to reduce the probability that, during the time delay in question, the sharpness of any exposures made during the time-delay interval will be unacceptably poor quality.

In accordance with the present invention, this is achieved by means of an automatic return of the camera's exposure objective to a predetermined distance-setting, when picture-taking is terminated.

Presently, the concept of the invention is deemed best applicable to the context of motion-picture cameras provided with distance-setting adjusting motors operating under the control of an actuating signal generated by a servo system, the command signal for the servo system being generated entirely automatically by an automatic distance-measuring device, or being selected manually by the user himself, or being generated as a hybrid of automatic distance measurement and manual selection. When a motion-picture sequence is terminated, the exposure objective does not remain in its most recently assumed distance-setting, but instead is automatically returned to a predetermined distance-setting.

In this way, when the next motion-picture sequence is to be shot, the exposure objective's distance-setting is always the same, creating a definite relationship between the magnitude of the time delay required to bring the exposure objective to the distance-setting next required, on the one hand, and, on the other hand, the camera-to-subject distance itself. To the extent that the user is aware of the time delay, the user's visual estimation of camera-to-subject distance now correlates with the focussing delay he experiences.

Furthermore, by automatically establishing a predetermined starting setting in this way, it becomes possible to per se reduce the probability of excessive focussing delays, and likewise to per se increase the probability that during the delay interval any exposures made will be of at least reasonably high image sharpness. This can be done, for example, by establishing the predetermined starting position at or near the middle of the range of distance-settings through which the exposure objective can be adjusted. In that event, the amount of the difference between the previous (now predetermined) distance-setting and the new distance-setting to be established is per se incapable of exceeding approximately one half the total adjustment range of the exposure objective. This serves both to "halve" the maximum possible duration of the focussing delay and, in a somewhat similar sense, to reduce the maximum possible amount of transitional state-of-focus error when exposures are made during establishment of the new distance-setting required. Furthermore, the decrease in the maximum duration of the focussing delay and the decrease in the maximum amount of state-of-focus error have a combinative effect, in the sense that these two decreases lead in combination to a very sizable decrease in the maximum time required for a quite good, if not yet optimal, state-of-focus situation to be achieved.

According to a further concept of the invention, the predetermined "starting" distance-setting in which the exposure objective will be at each initiation of shooting can be made preselectable. For example, the camera can be provided with a switch which the user flips from a middle distance-setting to maximum (infinity) distance-setting, to establish the predetermined starting setting at infinity, when the user knows that he will be shooting nearest that end of the range of available distance-settings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
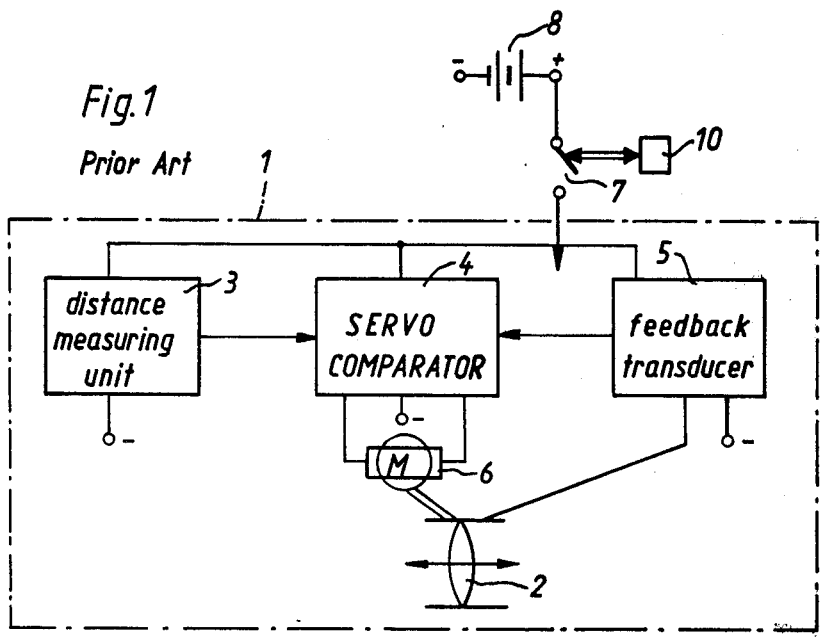
FIG. 1 is a schematic block diagram of a conventional automatic focussing system for motion-picture cameras.

FIG. 1 is a schematic block diagram of a conventional, fully automatic focussing system for motion-picture cameras. The focussing system per se is denoted by 1 and includes an exposure objective 2, a distance-measuring unit 3, a servo comparator 4, a feedback transducer 5, and an adjusting motor 6. The distance-measuring unit 3 can operate on any conventional basis, e.g., by travel-time measurement of waves emitted from the camera to the subject and reflected from the subject back to the camera, by purely optoelectrical methods involving ascertainment of subject distance on the basis of trigonometric triangulation, etc. In conventional manner, distance-measuring unit 3 measures the camera-to-subject distance, and applies a corresponding required-distance-setting signal to one input of servo comparator 4, the other input of the latter receiving from feedback transducer 5 a signal indicating the present distance-setting of exposure objective 2. Depending upon the sense of the discrepancy between the two signals, servo comparator 4 applies to adjusting motor 6 an actuating signal causing the latter to change the setting of objective 2 in the direction of longer or in the direction of shorter distance-settings.

In FIG. 1, whether the automatic focussing system is operative is determined by the setting of a simple on-off switch 7 serving to connect the operating voltage lines of stages 3–5 to the power source 8. Typically, on-off switch 7 is coupled to the release member 10 which the user depresses (or otherwise activates) to initiate shooting and lets go of to terminate shooting. In general, when the user lets go of release member 10, on-off switch 7 merely opens, disconnecting the focussing system 1 from power, with the result that objective 2 thereafter indefinitely remains in whatever distance-setting has most recently been assumed, i.e., until release member 10 is again activated to reinitiate shooting. When shooting is thusly reinitiated, the focussing system 1, in conventional servo fashion, adjusts objective 2 from such last or previous distance-setting to the new setting now required.

Figure 2:
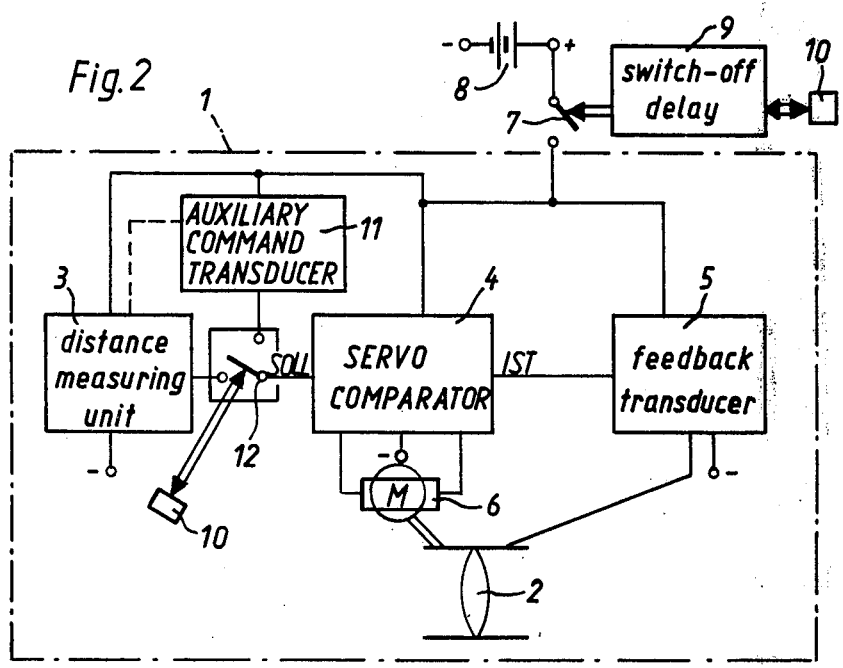
FIG. 2 is a schematic block diagram of a focussing system modified in accordance with the principle of the present invention.

FIG. 2 depicts the conventional automatic focussing system of FIG. 1 modified in accordance with the principle of the present invention. The system schematically depicted in FIG. 2 additionally includes a switch-off-delay stage 9 operative, when the user lets go of release member 10 at the termination of shooting, for preventing the illustrated circuitry from being disconnected from power source 8 for a predetermined time interval. Additionally, the system shown in FIG. 2 includes a preselector switch unit 12 coupled to release member 10 (which latter is shown a second time, for pictorial simplicity). Furthermore, the system of FIG. 2 includes a command-signal stage 11 operative for generating a command signal of the same form as those generated by distance-measuring stage 3. The command signal furnished by stage 11 determines the predetermined or "starting" distance-setting for objective 2.

When the user is about to depress release member 10 to initiate filming, exposure objective 2 will presently be in the distance-setting predetermined by the command signal from stage 11, for reasons which will become clear immediately below. When release member 10 is actually depressed, power-connect switch 7 immediately closes, connecting the schematically illustrated circuit stages 3, 4, 5 and 11 to power source 8, and preselector switch unit 12 assumes the setting thereof in which the left input of servo comparator 4 is connected to the output of distance-measuring unit 3. Accordingly, the automatic focussing system now operates in the conventional way, to change the setting of objective 2 to that commanded by distance-measuring unit 3. When the user lets go of release member 10 to terminate shooting, preselector switch unit 12 immediately changes setting, disconnecting the left input of servo comparator 4 from distance-measuring unit 3 and instead connecting it to the output of command-signal stage 11, as a result of which comparator 4 is commanded to cause adjusting motor 6 to establish the distance-setting determined by stage 11. Although the user has let go of release member 10, switch-off-delay unit 9 prevents power-connect switch 7 from immediately opening, and instead keeps the illustrated circuitry connected to power source 8 for a time interval long enough to assure that objective 2 is actually brought to the predetermined setting commanded by stage 11. After this has been accomplished, the delay interval introduced by switch-off-delay unit 9 elapses, and the illustrated circuitry becomes disconnected from power. The next time the user depresses release member 10, automatic focussing again commences immediately, but, as already stated, and for reasons now clear, proceeding from the predetermined or "starting" distance-setting selected by means of stage 11 and established upon termination of the previous shooting operation. In FIG. 2, the broken line extending between stages 3 and 11 indicates that the command signal furnished by stage 11 has the same form those furnished by distance-measuring stage 3, for compatibility.

Although the use of a switch-off-delay unit 9 is presently preferred on account of its simplicity, it will be appreciated that other delayed power-disconnect techniques could be employed, for example automatic power-disconnect responsive to the objective 2 actually reaching the distance-setting commanded by stage 11.

Figure 3:
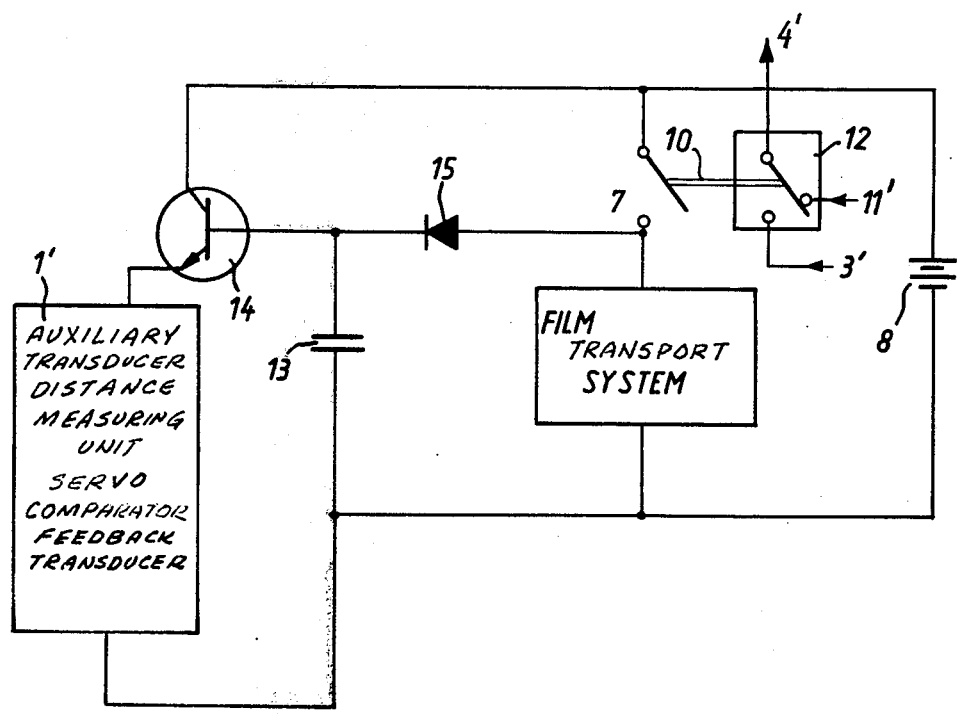
FIG. 3 is a partly schematic block diagram depicting the presently preferred mode of generating, upon the termination of filming, a time-delay within which the exposure objective can be brought to its starting setting.

FIG. 3 depicts somewhat schematically the sort of simple switch-off-delay configuration presently preferred for the purpose in question. Preselector switch 12 has an output terminal 4' connected to servo comparator 4, and two input terminals 3', 11' respectively connected to the outputs of distance-measuring stage 3 and command-signal stage 11. As indicated at 1' the operating-voltage line of the circuit stages 3, 4, 5 and 11 are connectable across power source 8 through the intermediary of a transistor switch 14. A timing capacitor 13 is connected in the base circuit of transistor switch 14 and is charged via a charging diode 15.

When the user depresses release member 10, preselector switch unit 12 changes from its illustrated to its non-illustrated setting, connecting the input of servo comparator 4 to the output of distance-measuring unit 3. Simultaneously, switch 7 is closed, connecting a film transport stage to power source 8, so that filming can immediately begin. The forward-bias resistance of charging diode 15 is negligibly low, and capacitor 13 can therefore virtually instantly achieve a voltage sufficient to render transistor switch 14 conductive, as a result of which the operating-voltage lines of the various circuit stages 3, 4, 5 and 11 (indicated by box 1') become connected across power source 8. Automatic focussing of conventional type thus commences immediately upon depression of release member 10, i.e., immediately upon the commencement of filming.

When the user lets go of release member 10 in order to terminate filming, switch 7 opens and preselector switch unit 12 disconnects the servo comparator 4 from distance-measuring unit 3 and instead connects comparator 4 to command-signal stage 11, as a result of which the system is commanded to adjust the exposure objective to the predetermined starting setting defined by stage 11. Despite the opening of switch 7, the operating-voltage lines of the various circuit stages remain connected to power source 8 for a time interval dependent upon the discharge of timing capacitor 13. In particular, capacitor 13 cannot discharge through charging rectifier 15, but only through the base-emitter circuit of transistor switch 14, and the time required for the capacitor discharge to reach a point rendering switch 14 non-conductive is selected long enough to assure that the system will, even in the worst case possible, have had time enough to bring the exposure objective to the starting setting commanded by stage 11.

In the preferred form of implementing the inventive concept, as just explained, the automatic return of the exposure objective to the predetermined starting distance-setting upon each termination of shooting is effected by furnishing the servo comparator (or the equivalent) of the system a command signal per se commanding that the objective be adjusted to the starting setting, whereupon the system responds in the same way as if such a command had been issued by the normal-operation command stage of the system, i.e., the distance-measuring unit 3, or equivalently a manually operated command stage employed for user-performed commanding of distance-settings. When the inventive concept is implemented in this way, it can be important for many system configurations that stage 11 furnish a command signal of the same form as furnished by the normal-operation command stage of the system. Especially when the command stage is an automatic distance-measuring unit, it is to be noted that such units can be provided in a very great variety of forms, issuing command signals of a variety of forms. Thus, such distance-measuring units are sometimes designed to issue a command signal which indicates required distance-setting by means of signal amplitude or magnitude, or by means of frequency, or by means of pulse-width when the command signal is pulse-width-modulated. Furthermore, some distance-measuring devices generate, in effect, two signals which in conjunction identify the commanded distance-setting. For example, one technique of this type involves generation of a first signal which varies with respect to time, e.g., a sawtooth-waveform signal; and a second or sampling signal is produced with variable timing, the value of the first signal at the time of generation of the second signal constituting the command signal, or constituting a signal whose end purpose is functionally equivalent to an ordinary command signal. Starting-setting command stage 11 may, accordingly, comprise a voltage divider, an oscillator, a bistable circuit such as a flip-flop or a monostable circuit triggered by a certain value of a control signal whose value varies with respect to time, and so forth.

Likewise, in general it will be understood that an automatic or automatic follow-up focussing system of a camera, although at bottom operating in accordance with negative-feedback or servo principles, may not divide itself so simply into a comparator stage, a command stage issuing a signal per se indicative of the required or desired distance-setting, and a feedback stage issuing a signal per se indicative of the exposure objective's present distance-setting. For example, simple "subtraction" of a required-setting signal and a present-setting signal may not per se occur, although the system as a whole operates in a manner in the end equivalent to a simple servo system such as outlined above. It will be understood that the concept of the invention can likewise be implemented in the context of systems having such non-elementary configurations.

Likewise, although it is presently very much preferred to impress a starting-setting command signal, per se indicative of the predetermined starting setting, onto the servo circuitry of the focussing system, there are other ways of implementing an equivalent end result. For example, when the user lets go of the release button, this could disconnect the output of the servo comparator from across the motor-energization circuitry, and serve to apply thereto instead another actuating signal, issued from a separately switched-in actuating-signal stage, operative for causing the adjusting motor to drive the exposure objective to the predetermined starting setting; this would be particularly appropriate, for example, when the predetermined starting setting is an end setting such as infinity-setting. Then, the actuating signal would be automatically removed from the adjusting motor, to prevent wasteful prolongation of motor energization, after the elapse of a time-delay interval (e.g., such as described above) long enough to assure that the starting-signal actuating signal will have actually achieved its intended result. Physical substitution of actuating-signal sources is particularly appropriate when the camera's focussing system is, to begin with, of the open-loop type.

Likewise, although it is very much preferred to employ the existing adjusting motor of such a focussing system to effect the return of the exposure objective to starting position, in those systems where feasible it would alternatively be possible to use a separate drive means to automatically perform the return-to-start adjustment, although in general this is not an approach to be preferred.

The advantage of the invention is most dramatic in the context of motion-picture cameras of the type where depression of the release member initiates filming substantially immediately, creating the problem that the initial exposures in the exposure sequence are performed as the focussing system is in the process of bringing the exposure objective into the required or selected distance-setting, because there the problem can be measured in terms of low image quality in the end product, i.e., the developed film. However, problems relating to the focussing delay can likewise arise, for example, in the case of a still camera in which an exposure should not be made until after the focussing system has fully implemented the required or selected distance-setting. In those camera contexts, the focussing delay translates into user impatience, and into the possible loss of a non-repeatable image to be photographed. Because, as already explained, the technique of the present invention inherently tends to reduce the focussing delay, the inventive technique is of advantage in such contexts, too.

As already stated, the stage 11 issuing the signal identifying the starting distance-setting can be a manually adjustable stage, to prevent user inconvenience when, for example, the user knows that he will be operating at a certain part of the available distance-settings range for an extended period and where, accordingly, repeated return of the exposure objective to a starting setting not in this part of the distance-settings range might be undesirable. Likewise, a system embodying the inventive concept could of course be provided with an override feature, such that by flipping a switch, or the like, the user can override the return-to-start action and switch over into conventional control action of the type in which the objective is merely left in its most recently assumed distance-setting at the time of power-disconnect.

It will be understood that each of the elements described above, or two or more together, may also find a useful application in other types of focussing-system configurations differing from the types described above.

While the invention has been illustrated and described as embodied in a focussing system including a bi-directionally actuatable electric adjusting motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and described to be protected by Letters Patent is set forth in the appended claims:

1. In a photographic camera provided with means for initiating and terminating shooting, an improved focussing system of the type comprised of an exposure objective, drive means operative when actuated for changing the distance-setting of the exposure objective, and actuating means operative for actuating the drive means to cause the latter to change the exposure objective's distance-setting, the improvement comprising the further provision of return-to-start means automatically operative upon the termination of shooting for returning the exposure objective to a variable predetermined starting distance-setting.

2. In a camera as defined in claim 1, the return-to-start means comprising means automatically operative upon the termination of shooting for changing the operation of the actuating means and in that way causing the exposure objective to be returned to the predetermined starting setting.

3. In a camera as defined in claim 1, the actuating means being a servo system comprising means generating a required-distance-setting signal, means generating a present-distance-setting signal, and means operative for developing from the latter two signals an actuating signal whose value varies in dependence upon the discrepancy indicated by those two signals, the means changing the operation of the actuating means comprising means operative for changing the operation of the actuating means by substituting for the required-distance-setting signal a predetermined signal commanding return of the exposure objective to the predetermined starting setting.

4. In a camera as defined in claim 3, the means generating the required-distance-setting signal comprising distance-measuring means operative for physically measuring camera-to-subject distance and developing the required-distance-setting signal in dependence upon that measurement.

5. In a camera as defined in claim 4, the means substituting for the required-distance-setting signal a predetermined signal comprising means substituting for the required-distance-setting signal a signal independent of the physical measurement performed by the distance-measuring means.

6. In a camera as defined in claim 1, the variable starting distance setting being intermediate the exposure objective's minimum distance-setting and its maximum distance-setting.

7. In a camera as defined in claim 1, furthermore including means operative for generating a signal indicating that shooting has been terminated.

8. In a camera as defined in claim 7, the camera including a release member operated by the user for initiating and terminating exposures, the means generating the signal indicating that shooting has been terminated being responsive to the release member.

9. In a camera as defined in claim 1, the actuating means including selecting means operative for changing the distance-setting into which the exposure objective is to be brought by the drive means, the return-to-start means including override means automatically operative upon the termination of shooting for overriding the operation of the selecting means and instead automatically selecting the predetermined starting setting.

10. In a camera as defined in claim 9, the aforementioned selecting means being a first selecting means, the return-to-start means including a second selecting means, the override means comprising means automatically operative upon the termination of shooting for disconnecting the first selecting means from the actuating means and instead connecting to the actuating means the second selecting means.

11. In a camera as defined in claim 9, the first selecting means comprising distance-measuring means operative for physically measuring camera-to-subject distance and automatically selecting an exposure-objective distance setting corresponding to that measurement.

12. In a camera as defined in claim 11, the first selecting means being operative for generating a first selection signal dependent upon the physical measurement of camera-to-subject distance, the override means comprising means for generating a second selection signal resulting in automatic selection of the predetermined starting setting, the first selection signal having a signal characteristic which varies depending upon what distance-setting is to be selected by the first selection signal, the second selection signal identifying the predetermined starting setting by virtue of the value of the same signal characteristic.

13. In a camera as defined in claim 1, the camera including a power source powering the return-to-start means, and furthermore including delayed-disconnect means operative upon the termination of shooting for automatically disconnecting the return-to-start means from the power source, the delayed-disconnect means delaying the power-disconnect for a time interval sufficient for the exposure objective to be brought to the predetermined starting setting.

14. In a camera as defined in claim 9, the camera including a power source powering the actuating means, and furthermore including delayed-disconnect means operative upon the termination of shooting for automatically disconnecting the actuating means from the power source, the delayed-disconnect means delaying the power-disconnect for a time-interval sufficient for the exposure objective to be brought to the predetermined starting setting.

15. In a camera as defined in claim 14, the delayed-disconnect means comprising a time-delay circuit introducing a substantially constant time delay prior to the power-disconnect, the duration of the time delay being substantially the same irrespective of the amount of time required to bring the exposure objective from its present distance setting to the starting setting.

16. In a camera as defined in claim 9, the variable starting setting being approximately in the middle of the distance-settings range intermediate the minimum and maximum distance-settings of the objective.

* * * * *